(12) United States Patent
Das et al.

(10) Patent No.: US 11,373,315 B2
(45) Date of Patent: Jun. 28, 2022

(54) METHOD AND SYSTEM FOR TRACKING MOTION OF SUBJECTS IN THREE DIMENSIONAL SCENE

(71) Applicant: Tata Consultancy Services Limited, Mumbai (IN)

(72) Inventors: Apurba Das, Bangalore (IN); Manikandtan Kartha, Bangalore (IN); Vaibhav Devariya, Bangalore (IN); Kajol Purushottam Zade, Bangalore (IN); Abhishek Biradar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 140 days.

(21) Appl. No.: 17/005,033

(22) Filed: Aug. 27, 2020

(65) Prior Publication Data
US 2021/0065377 A1  Mar. 4, 2021

(30) Foreign Application Priority Data
Aug. 30, 2019  (IN) .............................. 201921035141

(51) Int. Cl.
*G06K 9/00*  (2022.01)
*G06T 7/20*  (2017.01)
(Continued)

(52) U.S. Cl.
CPC ................. *G06T 7/20* (2013.01); *G06T 3/40* (2013.01); *G06T 7/571* (2017.01); *G06T 7/60* (2013.01);
(Continued)

(58) Field of Classification Search
None
See application file for complete search history.

(56) References Cited

U.S. PATENT DOCUMENTS 8,711,221 B2   4/2014   Eggert et al.
8,976,986 B2   3/2015   Angeloff et al.
(Continued)

FOREIGN PATENT DOCUMENTS

WO    WO2018015716 A1    1/2018

OTHER PUBLICATIONS

Mendapara ("Depth Map Estimation Using Multi-focus Imaging", 2010, University of Windsor) (Year: 2010).*
(Continued)

*Primary Examiner* — Randolph I Chu
(74) *Attorney, Agent, or Firm* — Finnegan, Henderson, Farabow, Garrett & Dunner, LLP (57) ABSTRACT

This disclosure relates generally to method and system for tracking motion of subjects in three dimensional space. The method includes receiving a video of the environment using a scene capturing device positioned in the environment. A motion intensity of subjects from the plurality of image frames are detected for segregating the motion of subjects present in each image frame from the plurality of image frames into a plurality of categories. Further, a three dimensional (3D) scene from the plurality of image frames are constructed using the multi focused view based depth calculation technique. The subjects are tracked based on the position in three dimensional (3D) scene categorized under the significant motion category. The proposed disclosure provides efficiency in tracking the new entry of subjects in the environment for adjusting the focus of observer.

12 Claims, 9 Drawing Sheets

(51) Int. Cl.
*G06T 7/571* (2017.01)
*G06T 7/70* (2017.01)
*G06T 3/40* (2006.01)
*G06T 7/60* (2017.01)

(52) U.S. Cl.
CPC ...... *G06T 7/70* (2017.01); *G06T 2207/10016* (2013.01); *G06T 2207/20221* (2013.01)

(56) References Cited

U.S. PATENT DOCUMENTS

| | | | |
|---|---|---|---|
| 10,192,415 B2* | 1/2019 | Heitz, III | G08B 13/19656 |
| 10,957,171 B2* | 3/2021 | Heitz, III | G06V 40/20 |
| 2012/0002112 A1* | 1/2012 | Huang | H04N 5/144 |
| | | | 348/E9.055 |
| 2013/0141233 A1* | 6/2013 | Jacobs | G16H 20/10 |
| | | | 340/521 |
| 2013/0329921 A1 | 12/2013 | Salsman | |
| 2017/0004629 A1* | 1/2017 | Zhao | G06V 10/44 |
| 2017/0368439 A1* | 12/2017 | Khazanov | A63B 24/0075 |
| 2018/0043247 A1* | 2/2018 | Vandonkelaar | A63F 13/213 |
| 2019/0236809 A1* | 8/2019 | Graziosi | G06T 7/20 |
| 2021/0133996 A1* | 5/2021 | Zhou | G01C 11/06 |
| 2021/0169318 A1* | 6/2021 | Sorimoto | A61B 1/24 |

OTHER PUBLICATIONS

Shi, Lei. "An Object Detection and Pose Estimation Approach tor Position Based Visual Servoing." Electrical, Control and Communication Engineering 12.1 (2017): 34-39.

* cited by examiner

METHOD AND SYSTEM FOR TRACKING MOTION OF SUBJECTS IN THREE DIMENSIONAL SCENE

PRIORITY CLAIM

This U.S. Patent application claims priority under 35 U.S.C § 119 to Indian patent application no. (201921035141), filed on Aug. 30, 2019. The entire contents of the aforementioned application are incorporated herein by reference.

TECHNICAL FIELD

The disclosure herein generally relates to tracking subjects, and, more particularly, to method and system for tracking motion of subjects in three dimensional scene.

BACKGROUND

Real-time multi-camera for tracking subjects and three dimensional (3D) positioning is an area of research interest because of its wide applicability in various applications such as automatic video surveillance. The main goal of detection and tracking is not only to monitor subjects, but also to automate the entire task for continuously monitoring certain actions performed by each subject present in the environment. Detection and tracking of subjects in three dimensional (3D) scene is not an easy task and requires efficient tracking technique. However, traditional tracking methods focus on accurately identifying the 2D location of subjects in the image frames of the video. Further, locating accurate positions of subjects is a highly challenging task due to cluttered backgrounds, occlusions, and angular viewpoint variations, etc. State of the art techniques for tracking subjects in three dimensional scene (3D) is not reliable and scalable yet. In such scenarios, a method for detecting accurate position of subjects in three dimensional (3D) scene for tracking is an emergent solution which provides a reliable system in order to broadly facilitate.

Most of the conventional methods, for tracking subjects in three dimensional scene use 2D image frames based on subjects behavioral pattern from the video data. However these 2D image frames with the subject is challenging to track due to cluttered backgrounds, occlusions, and viewpoint variations and the like, thereby affecting efficiency of subject tracking detection. Recent methods apply to track the subject present in the image frame, however, have limitations in detecting new entry or exit of the subjects into the environment and then tracking these new entries is challenging, affecting the efficiency of detection and tracking of subjects in an environment.

SUMMARY

Embodiments of the present disclosure present technological improvements as solutions to one or more of the above-mentioned technical problems recognized by the inventors in conventional systems. For example, in one embodiment, a system for tracking motion of subjects in three dimensional scene is provided. The system includes a processor, an Input/output (I/O) interface and a memory coupled to the processor is capable of executing programmed instructions stored in the processor in the memory to receive a video of the environment using a scene capturing device positioned in the environment. The received video comprises a plurality of image frames associated with a plurality of components of the environment and subjects present within the environment, wherein the subjects are non-stationary. Further, a motion intensity of subjects is detected from the plurality of image frames, based on a change detected in a position of the subjects in the current image frame with reference to the previous image frame among the plurality of image frames. Further, the motion of subjects present in each image frame are segregated from the plurality of image frames into a plurality of categories. The plurality of categories includes a no motion category, a significant motion category and an in-significant motion category. In the no motion category, if no motion is detected for the position of the subject present in each image frame. Further, for the significant motion category, if the change detected for the position of the subject is above a predefined threshold, indicating entry or exit of the subject from the environment and for the in-significant motion category, if the change detected for the position of the subject is below the predefined threshold, indicating minor movements of the subject in the environment. Furthermore, the motion of subjects are tracked in three dimensional (3D) scene by constructing, three dimensional (3D) scene from the plurality of image frames using the multi focused view based depth calculation technique, wherein each image frame from the plurality of image frames are merged with the similar image frame that define similar poses. Furthermore, the position of the subject are estimated by tracking the subject from three dimensional (3D) scene categorized under the significant motion category.

In an embodiment, the system further comprises to determine the global coordinates to position the exact location of subject in the environment based on a pre-estimated dimensions of the environment, the estimated height of the single monocular camera and the estimated height of the target capturing device. The dimensions of the environment are pre-estimated by processing the plurality of image frames using an estimation technique. The height of the single monocular camera is estimated using the extreme points of the ceiling and the floor of the environment based on the horizontal and vertical field of views. The height of the target capturing device is estimated based on the subject positioned from the ceiling and the floor. Further, a map is created for the environment using the pre-estimated dimensions of the environment, the global coordinates of the subject, the estimated height of the single monocular camera and the estimated height of the target capturing device. Furthermore, dynamically the directivity is adjusted for localizing the observed subject based on the subject's motion, the global coordinates and the dimensions of the environment.

In another aspect, a method for tracking motion of subjects in three dimensional scene is provided. The method includes a processor, an Input/output (I/O) interface and a memory coupled to the processor is capable of executing programmed instructions stored in the processor in the memory for receiving a video of the environment using a scene capturing device positioned in the environment. The received video comprises a plurality of image frames associated with a plurality of components of the environment and subjects present within the environment, wherein the subjects are non-stationary. Further, a motion intensity of subjects is detected from the plurality of image frames, based on a change detected in a position of the subjects in the current image frame with reference to the previous image frame among the plurality of image frames. Further, the motion of subjects present in each image frame are segregated from the plurality of image frames into a plurality of categories. The plurality of categories includes a no motion category, a significant motion category and an in-significant motion category. In the no motion category, if no motion is detected for the position of the subject present in each image frame. Further, for the significant motion category, if the change detected for the position of the subject is above a predefined threshold, indicating entry or exit of the subject from the environment and for the in-significant motion category, if the change detected for the position of the subject is below the predefined threshold, indicating minor movements of the subject in the environment. Furthermore, the motion of subjects are tracked in three dimensional (3D) scene by constructing, three dimensional (3D) scene from the plurality of image frames using the multi focused view based depth calculation technique, wherein each image frame from the plurality of image frames are merged with the similar image frame that define similar poses. Furthermore, the position of the subject is estimated by tracking the subject from three dimensional (3D) scene categorized under the significant motion category.

In an embodiment, the method further comprises to determine the global coordinates to position the exact location of subject in the environment based on a pre-estimated dimensions of the environment, the estimated height of the single monocular camera and the estimated height of the target capturing device. The dimensions of the environment are pre-estimated by processing the plurality of image frames using an estimation technique. The height of the single monocular camera is estimated using the extreme points of the ceiling and the floor of the environment based on the horizontal and vertical field of views. The height of the target capturing device is estimated based on the subject positioned from the ceiling and the floor. Further, a map is created for the environment using the pre-estimated dimensions of the environment, the global coordinates of the subject, the estimated height of the single monocular camera and the estimated height of the target capturing device. Furthermore, dynamically the directivity is adjusted for localizing the observed subject based on the subject's motion, the global coordinates and the dimensions of the environment.

In yet another aspect, a non-transitory computer readable medium having embodied thereon a computer program for executing a method for receive a video of the environment using a scene capturing device positioned in the environment. The received video comprises a plurality of image frames associated with a plurality of components of the environment and subjects present within the environment, wherein the subjects are non-stationary. Further, a motion intensity of subjects is detected from the plurality of image frames, based on a change detected in a position of the subjects in the current image frame with reference to the previous image frame among the plurality of image frames. Further, the motion of subjects present in each image frame are segregated from the plurality of image frames into a plurality of categories. The plurality of categories includes a no motion category, a significant motion category and an in-significant motion category. In the no motion category, if no motion is detected for the position of the subject present in each image frame. Further, for the significant motion category, if the change detected for the position of the subject is above a predefined threshold, indicating entry or exit of the subject from the environment and for the in-significant motion category, if the change detected for the position of the subject is below the predefined threshold, indicating minor movements of the subject in the environment. Furthermore, the motion of subjects are tracked in three dimensional (3D) scene by constructing, three dimensional (3D) scene from the plurality of image frames using the multi focused view based depth calculation technique, wherein each image frame from the plurality of image frames are merged with the similar image frame that define similar poses. Furthermore, the position of the subject is estimated by tracking the subject from three dimensional (3D) scene categorized under the significant motion category.

In an embodiment, the method further comprises to determine the global coordinates to position the exact location of subject in the environment based on a pre-estimated dimensions of the environment, the estimated height of the single monocular camera and the estimated height of the target capturing device. The dimensions of the environment are pre-estimated by processing the plurality of image frames using an estimation technique. The height of the single monocular camera is estimated using the extreme points of the ceiling and the floor of the environment based on the horizontal and vertical field of views. The height of the target capturing device is estimated based on the subject positioned from the ceiling and the floor. Further, a map is created for the environment using the pre-estimated dimensions of the environment, the global coordinates of the subject, the estimated height of the single monocular camera and the estimated height of the target capturing device. Furthermore, dynamically the directivity is adjusted for localizing the observed subject based on the subject's motion, the global coordinates and the dimensions of the environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provides a method and system for tracking motion of subjects in three dimensional scene. The system may be configured to detect and track subjects based on the motion performed by individual subject in three dimensional scene adapted to any open space or closed space environment. The system herein, may be interchangeably referred as subject tracking system. Further, the system disclosed provides a mechanism to construct three dimensional scene using a plurality of image frames from the video. This system also has a trigger mechanism which enables the tracking system to track individual subject based on the entry/exit of the new subject into the environment categorized based on each image frame from the video for dynamically adjusting observer subject focus on to the observed subject. The proposed system is a low-cost simple solution for dynamically tracking the position of subjects by changing the observer subjects on ceiling. The proposed method provides wide range of applications in the field of robotics, medicine, automobiles, remote sensing and microscopic objects.

Referring now to the drawings, and more particularly to FIG. 1 through 5, where similar reference characters denote corresponding features consistently throughout the figures, there are shown preferred embodiments and these embodiments are described in the context of the following exemplary system and/or method.

Figure 1:
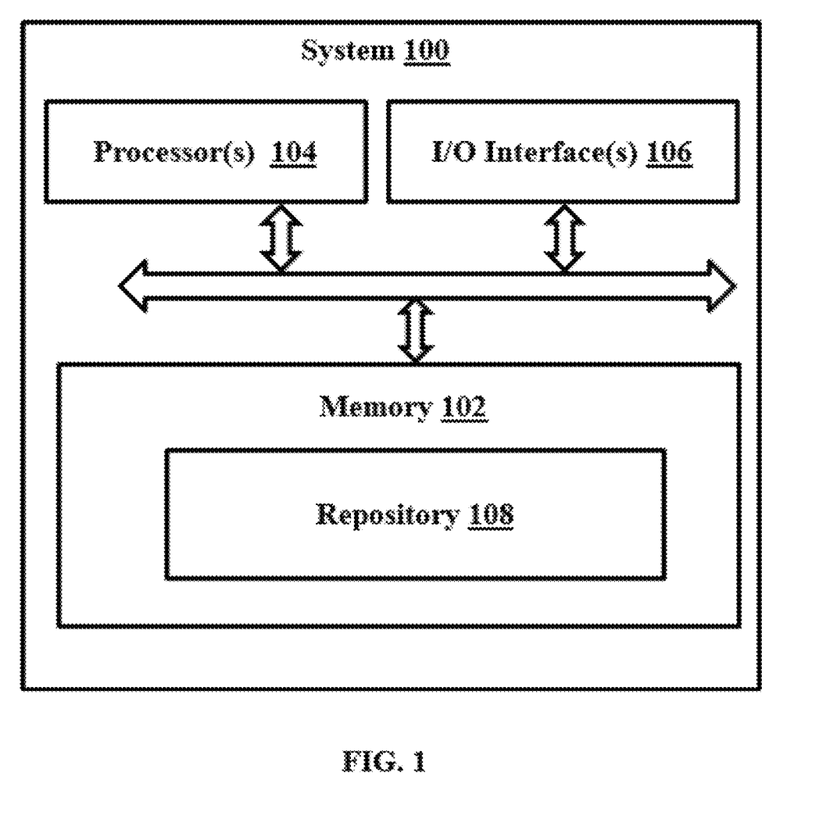
FIG. 1 illustrates a system for tracking motion of subjects in three dimensional (3D) scene, in accordance with some embodiments of the present disclosure.

FIG. 1 illustrates a system for tracking motion of subjects in three dimensional (3D) scene, in accordance with some embodiments of the present disclosure. In an embodiment, the system 100 includes processor (s) 104, communication interface device(s), alternatively referred as or input/output (I/O) interface(s) 106, and one or more data storage devices or memory 102 operatively coupled to the processor (s) 104. The processor (s) 104 may be alternatively referred as one or more hardware processors or simply processor (104). In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for receiving the video stream.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102, may include a repository 108. The memory 102 may further comprise information pertaining to input (s)/output(s) of each step performed by the system 100 and methods of the present disclosure.

The repository 108 may store the received video captured through a scene capturing device. The repository 108 may be external to the subject tracking system 100 or internal to the subject tracking system 100 (as shown in FIG. 1). The repository 108, coupled to the subject tracking system 100, may store the video to be processed for detecting and tracking the motion performed by the subject.

Figure 2:
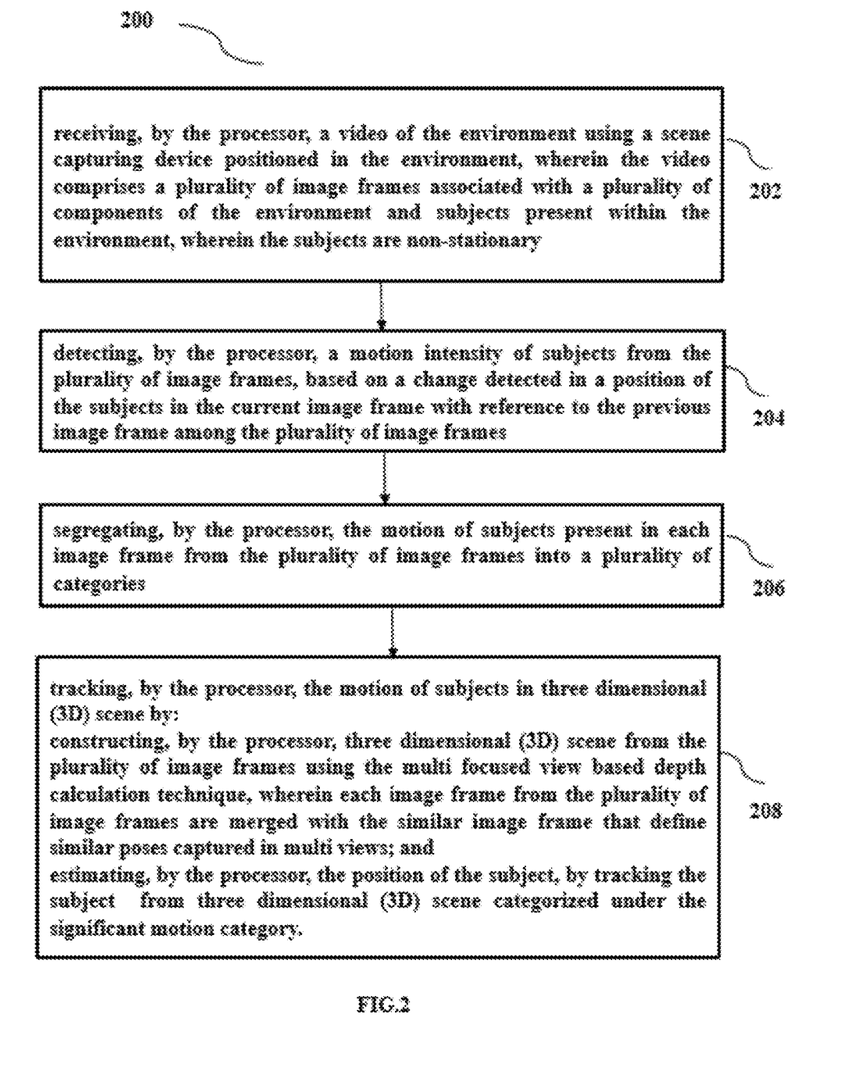
FIG. 2 illustrates a flow diagram for tracking motion of subjects in three dimensional (3D) scene using the system of FIG. 1, in accordance with some embodiments of the present disclosure.

FIG. 2 illustrates a flow diagram for tracking motion of subjects in three dimensional (3D) scene using the system of FIG. 1, in accordance with some embodiments of the present disclosure. The steps of the method 200 of the flow diagram will now be explained with reference to the components or blocks of the system 100 in conjunction with the example architecture of the system as depicted in FIG. 3*a* through FIG. 3*d*. Here, FIG. 3*a*, FIG. 3*b*, FIG. 3*c* and FIG. 3*d* illustrates an example showing detection and tracking motion of subjects in three dimensional scene using video in conjunction with FIG. 1, in accordance with some embodiments of the present disclosure. In an embodiment, the system 100 comprises one or more data storage devices or the memory 102 operatively coupled to the one or more processors 104 and is configured to store instructions for execution of steps of the method 200 by the one or more processors 104. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 202 of the method 200, the processor 104 is configured to receive, a video of the environment using a scene capturing device positioned in the environment. The video comprises a plurality of image frames associated with a plurality of components of the environment and subjects present within the environment are non-stationary. The received video streams are stored in the repository for further analysis and processing. The scene capturing device may be a monocular camera or a stereos based vision camera. The scene capturing device is positioned in such a way to capture video of the environment. The environment may be an open space or an enclosed space. The scene capturing device is positioned to capture field of view of the enclosed space or the open space. The present disclosure is further explained by considering an enclosed space environment for tracking individual subjects. Here, each image frame of the captured video are analyzed to detect motion intensity of the subjects from the plurality of image frames.

Figure 3A:
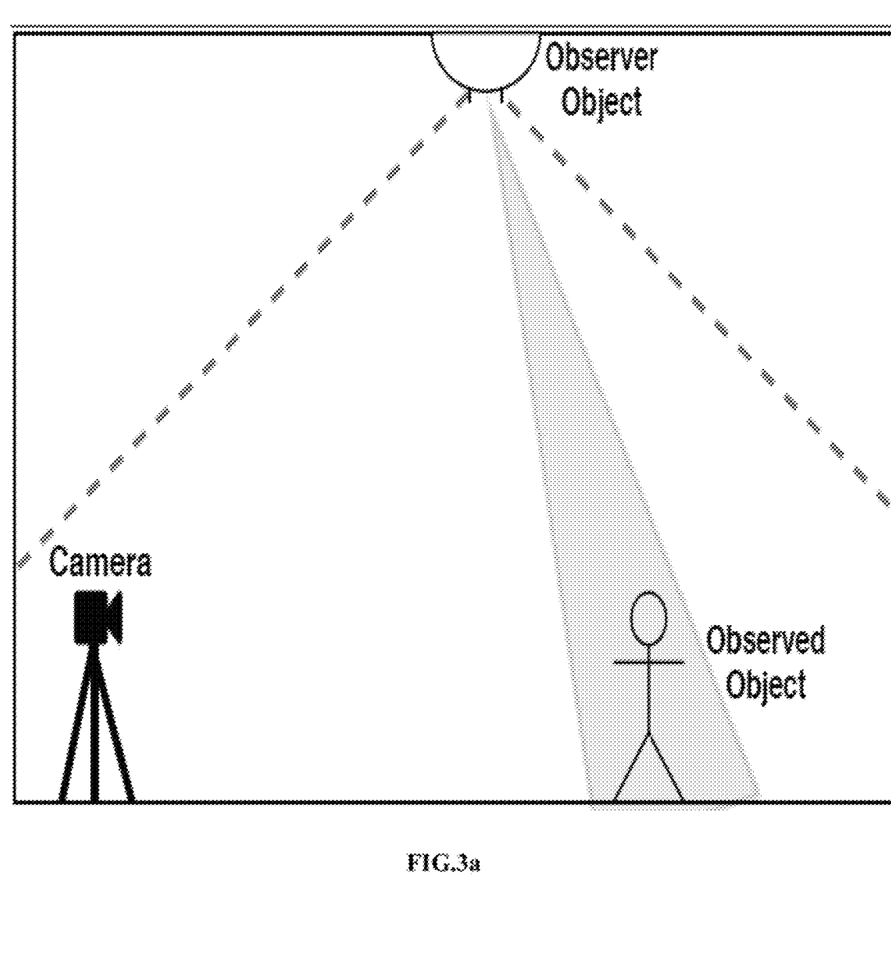
FIG. 3a, FIG. 3b, FIG. 3c and FIG. 3d illustrates an example showing detection and tracking motion of subjects in three dimensional scene usng video in conjunction with FIG. 1, in accordance with some embodiments of the present disclosure.

At step 204 of the method 200, the processor 104 is configured to detect, a motion intensity of the subjects from the plurality of image frames, based on a change detected in a position of the subjects in the current image frame with reference to the previous image frame among the plurality of image frames. Referring now to FIG. 3a which depicts an example environment comprising a scene capturing device and subjects which are non-stationary in the environment. Each image frame from the plurality of image frames are analyzed to detect the motion of subjects in each image frame. The motion intensity of each subject is detected based on the position of the subjects in the current image frame with reference to the previous image frame.

At step 206 of the method 200, the processor 104 is configured to segregate, the motion of subjects present in each image frame from the plurality of image frames into a plurality of categories. Referring to the above example, the method detects motion of subjects in each image frame from the plurality of image frames. Based, on the subjects motion intensity present in each image frame from the plurality of image frames are analyzed to categorize each image frame into a plurality of categories. The plurality of categories includes a no motion category, a significant motion category and an in-significant motion category. Each image frame will be categorized into a no motion category, if no motion is detected for the position of the subject present in each image frame. Further, if the change detected for the position of the subject is above a predefined threshold, indicates entry or exit of the subject from the environment, such image frames will be categorized into a significant motion category. Here, the entry is a new entry of subject into the environment and an exit is the subject moving out from the environment. Further, for the in-significant motion category, the change detected for the position of the subject is below the predefined threshold, indicating minor movements of the subject in the environment. In each image frame the bounding box is created if there exists a "subject" and if there is no "subject", present in the image frame then the image frame will be discarded from further processing. The bounding box on each image frame improves the accuracy for detecting the subject present in each image frame.

Figure 3B:
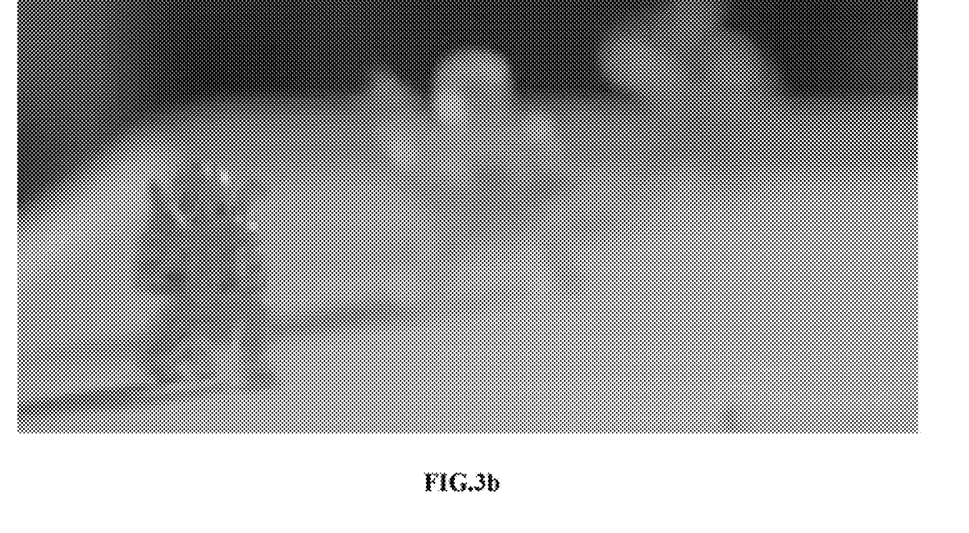
Figure 3C:
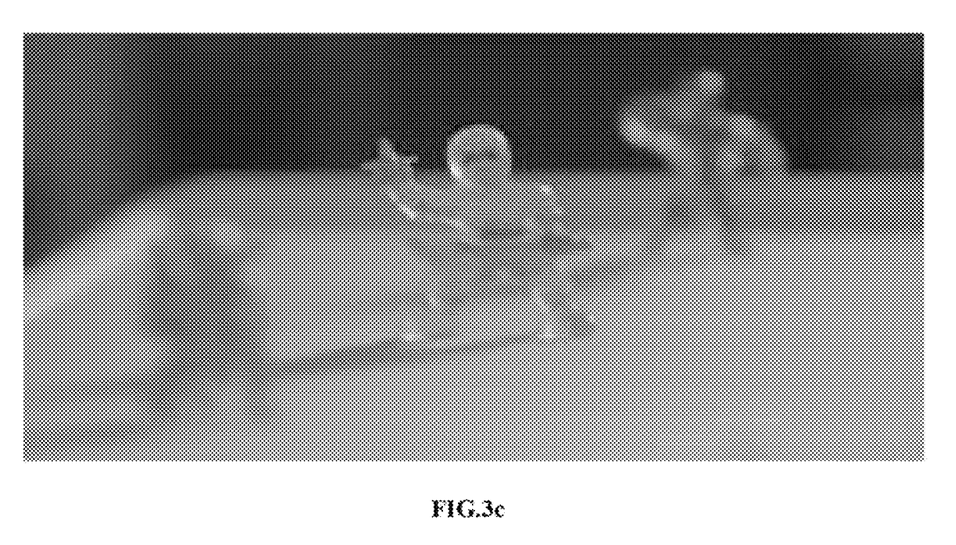
Figure 3D:
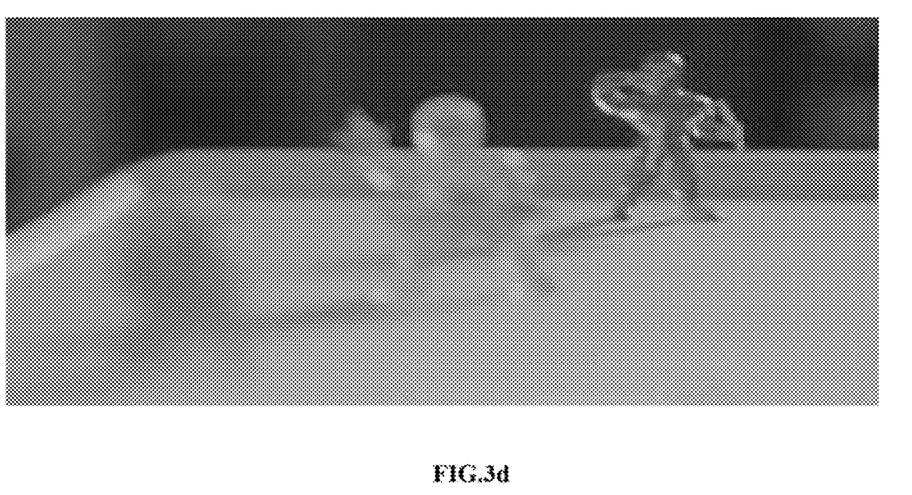

At step 208 of the method 200, the processor 104 is configured to track, the motion of subjects in three dimensional (3D) scene based on the motion category. Referring, now to FIG. 3a, FIG. 3b, FIG. 3c and FIG. 3d illustrates an example showing detection and tracking motion of subjects in three dimensional scene using video. The image frames categorized into significant motion category, triggers the system to perform tracking based on the new entry of subjects or exit of subjects detected in the environment. To track these subjects, a dimensional (3D) scene from the plurality of image frames are constructed using a multi focused view based depth calculation technique. Here, each image frame from the plurality of image frames are merged with the similar image frame that define similar poses. To reconstruct the three dimensional (3D) scene, the plurality of images are captured by focusing a particular subject by varying the focus of scene capturing device. The focus of scene capturing device obtains focused area in each frame in different regions moving forward to backward or in a reverse way as shown in FIG. 3b, FIG. 3c and FIG. 3d. Further, each resized image frame from the plurality of image frames are converted into a plurality of gray scale image frames.

Figure 4A:
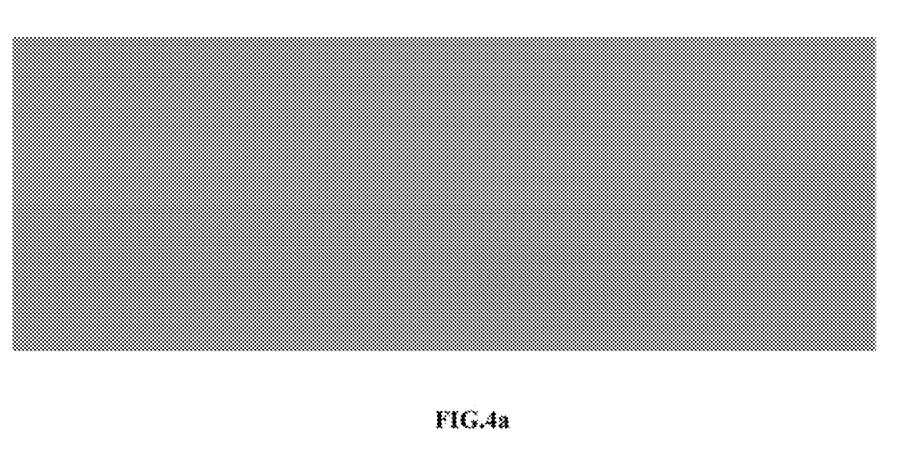
FIG. 4a, illustrates experimental results of windowing size (15*15) tracking motion of subjects in three dimensional (3D) scene in conjunction with the system of FIG. 1, in accordance with some embodiments of the present disclosure.
Figure 4B:
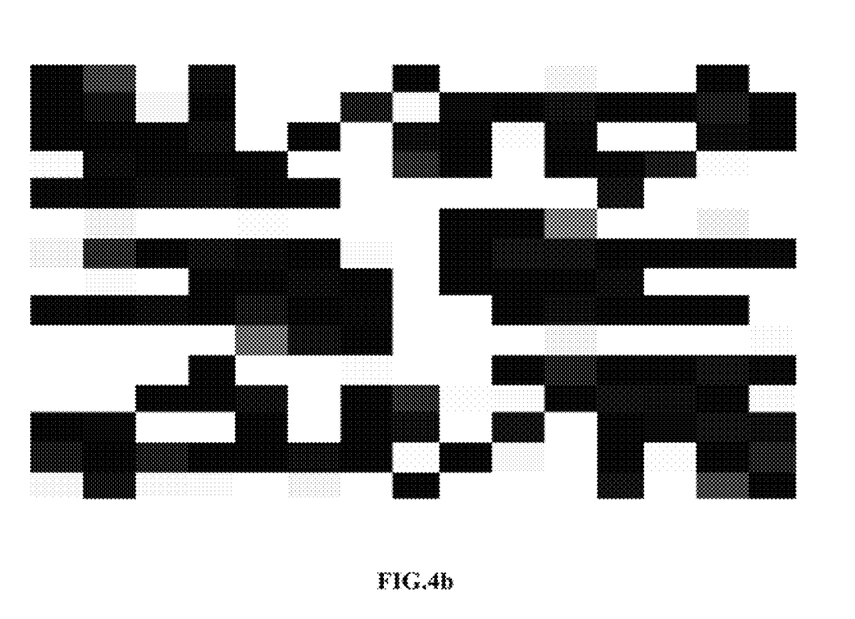
FIG. 4b, illustrates experimental results of window in frequency domain tracking motion of subjects in three dimensional (3D) scene in conjunction with the system FIG. 1, in accordance with some embodiments of the present disclosure.
Figure 4C:
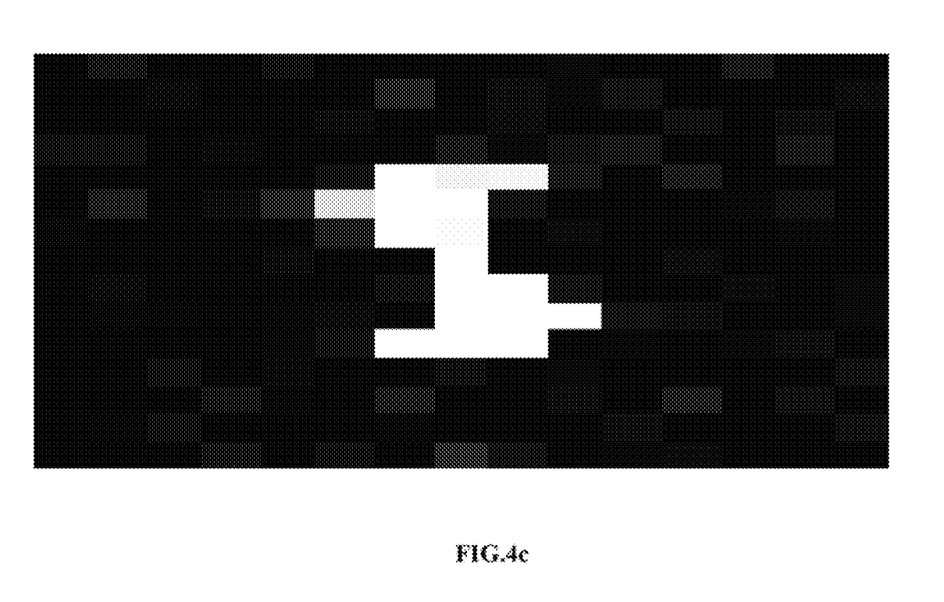
FIG. 4c, illustrates experimental results of low frequency (LF) part in frequency domain tracking motion of subjects in three dimensional (3D) scene in conjunction with the system of FIG. 1, in accordance with some embodiments of the present disclosure.
Figure 4D:
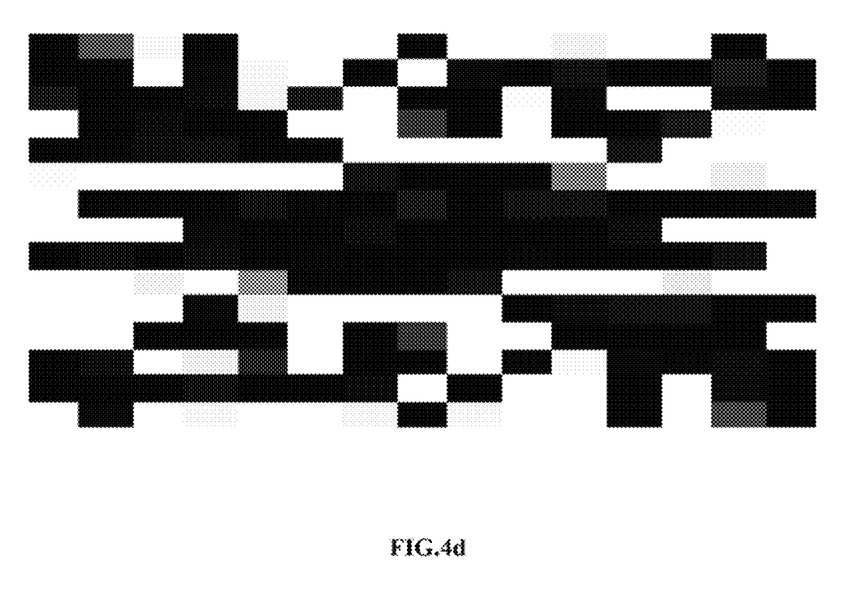
FIG. 4*d*, illustrates experimental results of high frequency (HF) part in frequency domain tracking motion of subjects in three dimensional (3D) scene in conjunction with the system of FIG. 1, in accordance with some embodiments of the present disclosure.
Figure 4E:
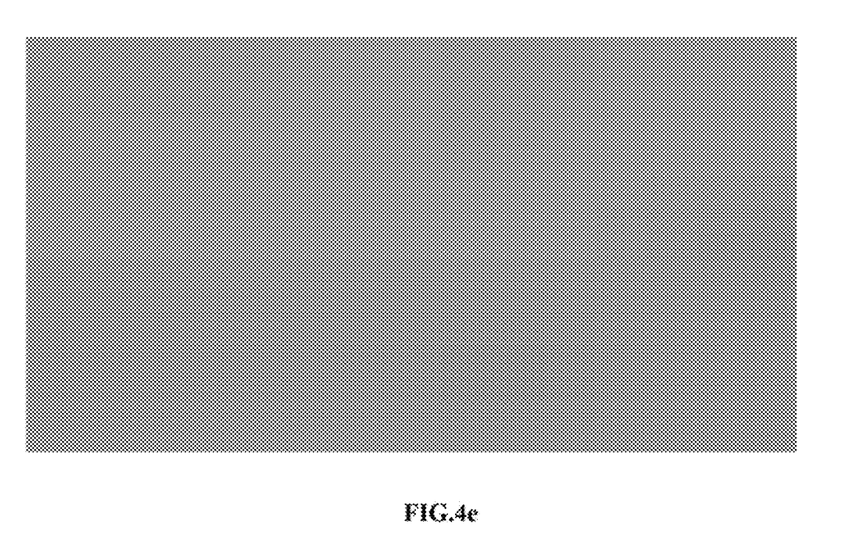
FIG. 4*e*, illustrates experimental results of focused window of image frames in conjunction with the system FIG. 1, in accordance with some embodiments of the present disclosure.

In an embodiment, the multi focused view based depth calculation technique is depicted with reference to FIG. 4a, FIG. 4b, FIG. 4c, FIG. 4d and FIG. 4e. The bounding box is created for the subjects present in each image frame for resizing of each image frames from the plurality of each image frames. Initially, each image frame from the plurality of image frames are preprocessed to resized and converted into grayscale images. Further, for each gray scale image frame from the plurality of gray scale image frames a frequency domain is determined by performing windowing. Referring now to FIG. 4a, the windowing is performed for a window of (15*15) for each image frame. Then, a high frequency (HF) part and a low frequency (LF) part is obtained using the frequency domain of each gray scale image frame. Referring now to FIG. 4b, the window is converted into frequency domain using Fourier transform. Focused regions have more high frequency (HF) part and less low frequency (LF) part compared to blurred regions in each image frame. The ratio of high frequency (HF) part to low frequency (LF) part of focused region is more than that of blurred region. Referring now to FIG. 4c and FIG. 4d, the low frequency (LF) part and high frequency (HF) part are filtered. Then a ratio is determined using the high frequency (HF) part and the low frequency (LF) part for each gray scale image frame. Referring now to FIG. 4e, the highest ratio of each gray scale image frame is determined based on the ratio of high frequency (HF) part and the low frequency (LF) part for the particular window in each image frame. Then highest ratio is calculated and that image frame number is marked as depth in depth matrix for all pixels in that window. Window belonging to the image frame number is the focused window. Then, a gray scale image frame from the plurality of gray scale image frames are marked based on the highest ratio as depth in a depth matrix for down sampling by the factor of 15 (window size) in both direction and again resultant matrix is interpolated by the same factor i.e. 15. The depth matrix are interpolated by converting the size of the depth matrix same as size of each gray scale image frame. The depth matrix size is same as image matrix size. Then, a three dimensional (3D) scene is constructed by obtaining x, y, z coordinates, pixel intensity values and depth values of each gray scale image frame. Further, using the constructed the three dimensional (3D) scene the position of the subjects are tracked for the images categorized under the significant motion category.

Figure 5A:
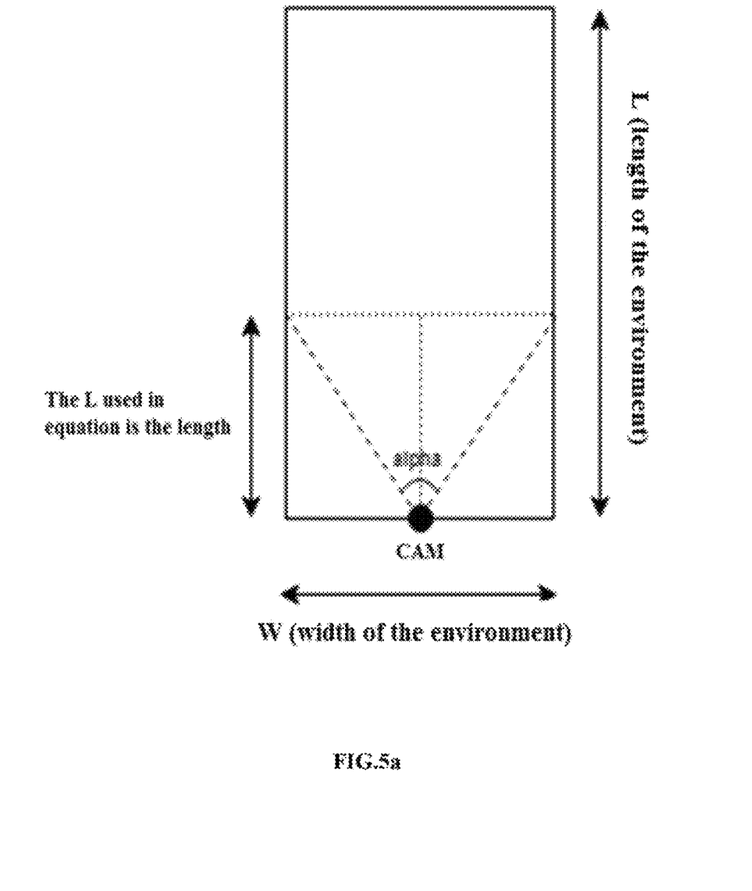
FIG. 5*a* illustrates dimensions of the environment from the video using the system FIG. 1, in accordance with some embodiments of the present disclosure.

FIG. 5a illustrates estimating dimensions of the environment from the video using the system FIG. 1, in accordance with some embodiments of the present disclosure. In an embodiment, the method further extends to determine the global coordinates to position the exact location of each subjects in the environment based on a pre-estimated dimensions of the environment, the estimated height of the single monocular camera and the estimated height of the target capturing device. The dimensions of the environment is pre-estimated by processing the plurality of image frames using an estimation technique. The height of the scene capturing device is estimated using the extreme points of the ceiling and the floor of the environment based on the horizontal and vertical field of views. The height of the target capturing device is estimated based on the subject positioned from the ceiling and the floor. Further, the target capturing device is detected using deep convolutional neural network CNN and then the height is determined from the floor of the environment. Further, a map of the environment is created using the pre-estimated dimensions of the environment, the global coordinates of the subject, the estimated height of the single monocular camera and the estimated height of the target capturing device.

Figure 5B:
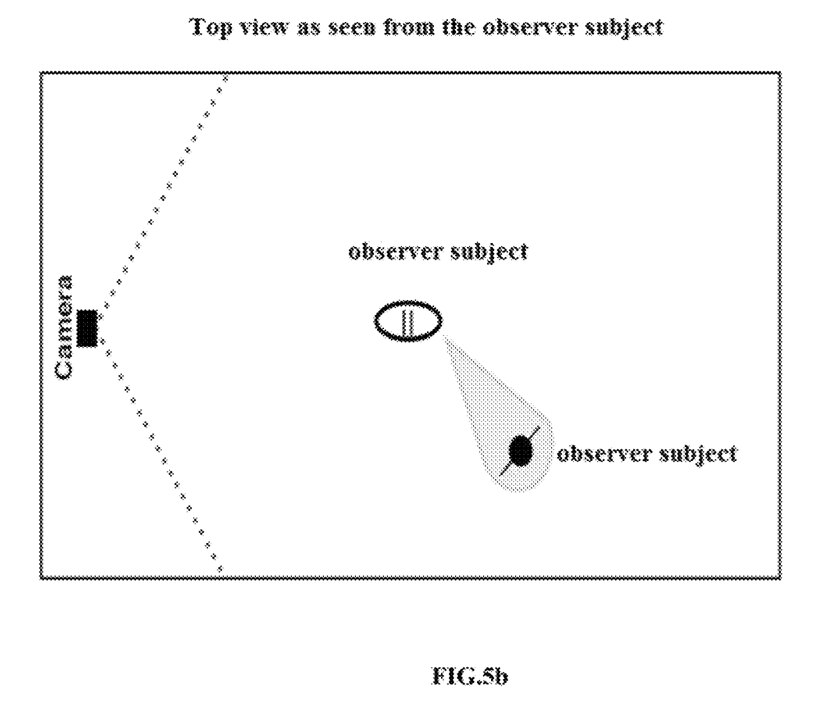
FIG. 5*b* illustrates example depicting top view from the observer subject as shown for tracking motion of subjects in three dimensional scene from the video using the system FIG. 1, in accordance with some embodiments of the present disclosure.

Now referring to FIG.5a and FIG.5b, the estimation technique is utilized to pre-estimate the dimensions of the environment using the plurality of image frames from the video. The length and height of extreme solid walls of the environment are determined based on the horizontal and vertical field of views of the scene capturing device and the constructed 3D scene. The farthest pixel in the vicinity is the intersection of camera FoV and enclosed space environment (opaque). The camera FOV is applicable to both horizontal and vertical as depicted below in equation 1, $$2L * \tan\frac{\alpha}{2} \quad (1)$$

L, is the enclosed space of the farthest pixel obtained from the disparity based depth calculation.

W, is the width of the enclosed space environment if the scene capturing device is placed at the center.

Further, depths of the extreme solid walls of the environment are determined based on the depth of last pixel observed in the horizontal and vertical field of views in the scene capturing device. The directivity for localizing the observed subject based on the subject's motion is adjusted dynamically based on the global coordinates and the dimensions of the environment.

The embodiments of present disclosure herein addresses the problem of tracking subjects in the environment. The embodiment, thus provides a method for tracking motion of subjects in three dimensional scene. The technique provided is robust and dimensions estimated for obtaining depth may be adapted to any open space environments or the closed space environments. The system is capable of constructing three dimensional scene from the plurality of image frames for tracking new entry and exit of subjects in the environment with proven efficiency. Therefore, each sequential step in the proposed method helps in tracking of new entry subjects in the environment in most scalable and efficient way. The proposed disclosure provides a technique for measuring the environment using the scene capturing device. This method enables dynamic tracking of observed subject in the environment through any observer object like spot light, microphone etc. The observer subjects three dimensional (3D) scene also detected dynamically. The proposed method also creates a map of the three dimensional (3D) scene for a clear top view look which changes dynamically with respect to real-time position of observer and observed subjects. Additionally, the method also provides dynamic direction of the observation (e.g. like spot light, microphone etc.) which ensures high quality reception of the observed subject by eliminating background noise or unintended subjects present in the environment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for tracking motion of subjects in three dimensional (3D) scene, wherein the method comprises:
   receiving, via one or more hardware processors, a video of an environment using a scene capturing device positioned in the environment, wherein the video comprises a plurality of image frames associated with a plurality of components of the environment and subjects present within the environment, wherein the subjects are non-stationary;
   detecting, via the one or more hardware processors, a motion intensity of subjects from the plurality of image frames, based on a change detected in a position of the subjects in a current image frame with reference to a previous image frame among the plurality of image frames;
   segregating, via the one or more hardware processors, the motion of subjects present in each image frame from the plurality of image frames into a plurality of categories comprising:
      a no motion category, if no motion is detected for the position of the subject present in each image frame;
      a significant motion category, if the change detected for the position of the subject is above a predefined threshold, indicating entry or exit of the subject from the environment;
      an in-significant motion category, if the change detected for the position of the subject is below the predefined threshold, indicating minor movements of the subject in the environment; and
   tracking, via the one or more hardware processors, the motion of subjects in a three dimensional (3D) scene based on the motion category by,
      constructing, the three dimensional (3D) scene from the plurality of image frames using a multi focused view based depth calculation technique, wherein each image frame from the plurality of image frames are merged with a similar image frame that define similar poses;
      estimating, the position of the subject, by tracking the subject from the three dimensional (3D) scene categorized under the significant motion category; and
      dynamically adjusting, via the one or more hardware processors, a directivity for localizing the subject's observed in the environment by,
         determining, global coordinates to position an exact location of the subject in the environment based on a pre-estimated dimensions of the environment, an estimated height of the scene capturing device and an estimated height of a target capturing device, wherein the target capturing device focus on the subject positioned within the environment;
         creating, a map of the environment using the pre-estimated dimensions of the environment, the global coordinates of the subject, the estimated height of the scene capturing device and the estimated height of the target capturing device; and
         dynamically adjusting, the directivity for localizing the subject's observed in the environment based on the subject's motion, the global coordinates and the dimensions of the environment.

2. The method as claimed in claim 1, wherein the multi focused view based depth calculation for estimating position of the subject comprises:
   resizing, each image from the plurality of image frames;
   converting, each resized image from the plurality of image frames into a plurality of gray scale image frames;
   determining, a frequency domain of each gray scale image frame by applying windowing on each gray scale image frame;
   obtaining, a high frequency (HF) part and a low frequency (LF) part using the frequency domain of each gray scale image frame
   determining, a ratio of the high frequency (HF) part and the low frequency (LF) part of each gray scale image frame;
   determining, the highest ratio of each gray scale image frame based on the ratio of the high frequency (HF) part and the low frequency (LF) part;
   marking, a gray scale image frame from the plurality of gray scale image frames based on the highest ratio as depth in a depth matrix for down sampling;
   interpolating, the depth matrix to convert size of the depth matrix same as size of each gray scale image frame; and
   obtaining, a map using the 3D scene by obtaining a x, y, z coordinates, a pixel intensity values and depth values of each gray scale image frame.

3. The method as claimed in claim 1, wherein
   the dimensions of the environment is pre-estimated by processing the plurality of image frames using an estimation technique,
   wherein the height of the scene capturing device is estimated using extreme points of the ceiling and the floor of the environment based on the horizontal and the vertical field of views, and
   wherein the height of the target capturing device is estimated based on the subject positioned from the ceiling and the floor.

4. The method as claimed in claim 3, wherein the estimation technique for pre-estimating the dimensions of the environment comprises:
   determining, a length and a height of extreme solid walls of the environment based on a horizontal and a vertical field of views of the scene capturing device and the constructed 3D scene; and
   determining, depths of the extreme solid walls of the environment based on the depth of last pixel observed in the horizontal and the vertical field of views in the scene capturing device.

5. A system for tracking motion of subjects in three dimensional (3D) scene, comprising:
   a memory storing instructions;
   one or more communication interfaces; and
   one or more hardware processors coupled to the memory via the one or more communication interfaces, wherein the one or more hardware processors are configured by the instructions to:
   receive, a video of an environment using a scene capturing device positioned in the environment, wherein the video comprises a plurality of image frames associated with a plurality of components of the environment and subjects present within the environment, wherein the subjects are non-stationary;
   detect, a motion intensity of subjects from the plurality of image frames, based on a change detected in a position of the subjects in a current image frame with reference to a previous image frame among the plurality of image frames;
   segregate, the motion of subjects present in each image frame from the plurality of image frames into a plurality of categories comprising:
      a no motion category, if no motion is detected for the position of the subject present in each image frame;
      a significant motion category, if the change detected for the position of the subject is above a pre-defined threshold, indicating entry or exit of the subject from the environment;
      an in-significant motion category, if the change detected for the position of the subject is below the predefined threshold, indicating minor movements of the subject in the environment; and
   track, the motion of subjects in a three dimensional (3D) scene based on the motion category by,
      constructing, the three dimensional (3D) scene from the plurality of image frames using a multi focused view based depth calculation technique, wherein each image frame from the plurality of image frames are merged with a similar image frame that define similar poses;
      estimating, the position of the subject, by tracking the subject from the three dimensional (3D) scene categorized under the significant motion category; and
   dynamically adjust, a directivity for localizing the subject's observed in the environment by,
      determining, global coordinates to position an exact location of the subject in the environment based on a pre-estimated dimensions of the environment, an estimated height of the scene capturing device and an estimated height of a target capturing device, wherein the target capturing device focus on the subject positioned within the environment;
      creating, a map of the environment using the pre-estimated dimensions of the environment, the global coordinates of the subject, the estimated height of the scene capturing device and the estimated height of the target capturing device; and
      dynamically adjusting, the directivity for localizing the subject's observed in the environment based on the subject's motion, the global coordinates and the dimensions of the environment.

6. The system as claimed in claim 5, wherein the multi focused view based depth calculation for estimating position of the subject comprises:
   resizing, each image from the plurality of image frames;
   converting, each resized image from the plurality of image frames into a plurality of gray scale image frames;
   determining, a frequency domain of each gray scale image frame by applying windowing on each gray scale image frame;
   obtaining, a high frequency (HF) part and a low frequency (LF) part using the frequency domain of each gray scale image frame
   determining, a ratio of the high frequency (HF) part and the low frequency (LF) part of each gray scale image frame;
   determining, the highest ratio of each gray scale image frame based on the ratio of the high frequency (HF) part and the low frequency (LF) part;
   marking, a gray scale image frame from the plurality of gray scale image frames based on the highest ratio as depth in a depth matrix for down sampling;
   interpolating, the depth matrix to convert size of the depth matrix same as size of each gray scale image frame; and
   obtaining, a map using the 3D scene by obtaining a x, y, z coordinates, a pixel intensity values and depth values of each gray scale image frame.

7. The system as claimed in claim 5, wherein
   the dimensions of the environment is pre-estimated by processing the plurality of image frames using an estimation technique,
   wherein the height of the scene capturing device is estimated using extreme points of the ceiling and the floor of the environment based on the horizontal and the vertical field of views, and
   wherein the height of the target capturing device is estimated based on the subject positioned from the ceiling and the floor.

8. The system as claimed in claim 7, wherein the estimation technique for pre-estimating the dimensions of the environment comprises:
   determine, a length and a height of extreme solid walls of the environment based on a horizontal and a vertical field of views of the scene capturing device and the constructed 3D scene; and
   determine, depths of the extreme solid walls of the environment based on the depth of last pixel observed in the horizontal and the vertical field of views in the scene capturing device.

9. One or more non-transitory machine-readable information storage mediums comprising one or more instructions which when executed by one or more hardware processors perform actions comprising:
   receiving, a video of an environment using a scene capturing device positioned in the environment, wherein the video comprises a plurality of image frames associated with a plurality of components of the environment and subjects present within the environment, wherein the subjects are non-stationary;
   detecting, a motion intensity of subjects from the plurality of image frames, based on a change detected in a position of the subjects in a current image frame with reference to a previous image frame among the plurality of image frames;
   segregating, the motion of subjects present in each image frame from the plurality of image frames into a plurality of categories comprising:

a no motion category, if no motion is detected for the position of the subject present in each image frame;

a significant motion category, if the change detected for the position of the subject is above a predefined threshold, indicating entry or exit of the subject from the environment;

an in-significant motion category, if the change detected for the position of the subject is below the predefined threshold, indicating minor movements of the subject in the environment; and tracking, the motion of subjects in a three dimensional (3D) scene based on the motion category by, constructing, the three dimensional (3D) scene from the plurality of image frames using a multi focused view based depth calculation technique, wherein each image frame from the plurality of image frames are merged with a similar image frame that define similar poses;

estimating, the position of the subject, by tracking the subject from the three dimensional (3D) scene categorized under the significant motion category; and dynamically adjusting, via the one or more hardware processors, a directivity for localizing the subject's observed in the environment by, determining, global coordinates to position an exact location of the subject in the environment based on a pre-estimated dimensions of the environment, an estimated height of the scene capturing device and an estimated height of a target capturing device, wherein the target capturing device focus on the subject positioned within the environment;

creating, a map of the environment using the pre-estimated dimensions of the environment, the global coordinates of the subject, the estimated height of the scene capturing device and the estimated height of the target capturing device; and dynamically adjusting, the directivity for localizing the subject's observed in the environment based on the subject's motion, the global coordinates and the dimensions of the environment.

10. The one or more non-transitory machine-readable information storage mediums of claim 9, wherein the multi focused view based depth calculation for estimating position of the subject comprises:

resizing, each image from the plurality of image frames;

converting, each resized image from the plurality of image frames into a plurality of gray scale image frames;

determining, a frequency domain of each gray scale image frame by applying windowing on each gray scale image frame;

obtaining, a high frequency (HF) part and a low frequency (LF) part using the frequency domain of each gray scale image frame determining, a ratio of the high frequency (HF) part and the low frequency (LF) part of each gray scale image frame;

determining, the highest ratio of each gray scale image frame based on the ratio of the high frequency (HF) part and the low frequency (LF) part;

marking, a gray scale image frame from the plurality of gray scale image frames based on the highest ratio as depth in a depth matrix for down sampling;

interpolating, the depth matrix to convert size of the depth matrix same as size of each gray scale image frame; and obtaining, a map using the 3D scene by obtaining a x, y, z coordinates, a pixel intensity values and depth values of each gray scale image frame.

11. The one or more non-transitory machine-readable information storage mediums of claim 9, wherein the the dimensions of the environment is pre-estimated by processing the plurality of image frames using an estimation technique, wherein the height of the scene capturing device is estimated using extreme points of the ceiling and the floor of the environment based on the horizontal and the vertical field of views, and wherein the height of the target capturing device is estimated based on the subject positioned from the ceiling and the floor.

12. The one or more non-transitory machine-readable information storage mediums of claim 11, wherein the estimation technique for pre-estimating the dimensions of the environment comprises:

determining, a length and a height of extreme solid walls of the environment based on a horizontal and a vertical field of views of the scene capturing device and the constructed 3D scene; and determining, depths of the extreme solid walls of the environment based on the depth of last pixel observed in the horizontal and the vertical field of views in the scene capturing device.

\* \* \* \* \*